United States Patent [19]

Busboom et al.

[11] Patent Number: 5,345,553
[45] Date of Patent: Sep. 6, 1994

[54] METHOD AND APPARATUS FOR CONSTRUCTING EDIT MASK ENTRY FIELDS WITH MULTIPLE NONPROGRAMMABLE TERMINALS ATTACHED TO A WORKSTATION CONTROLLER

[75] Inventors: Leah J. H. Busboom, Oronoco; Stephen T. Eagen; Harvey G. Kiel, both of Rochester, all of Minn.

[73] Assignee: International Business Machines Corporation, Armonk, N.Y.

[*] Notice: The portion of the term of this patent subsequent to July 7, 2009, has been disclaimed.

[21] Appl. No.: 639,508

[22] Filed: Jan. 9, 1991

[51] Int. Cl.$^5$ ............................................... G06F 3/14
[52] U.S. Cl. ..................................... 395/161; 395/155
[58] Field of Search ............... 395/153, 155, 148, 149, 395/146, 161

[56] References Cited

U.S. PATENT DOCUMENTS 4,757,441  7/1988  Buckland et al. ................... 395/153
5,008,853  4/1991  Bly et al. ............................... 395/153
5,091,868  2/1992  Pickens et al. ....................... 395/148
5,129,056  7/1992  Eagen et al. .......................... 395/161

Primary Examiner—Gary V. Harkcom
Assistant Examiner—Mike Smith
Attorney, Agent, or Firm—Palmatier, Sjoquist & Helget

[57] ABSTRACT

A method and apparatus for constructing edit mask entry fields for display panel data, in a system including a host processor, a workstation controller, and a number of workstations, each workstation having a keyboard and display screen. The edit mask entry field mask positions are protected when display panel information is modified, by special hardware and software operations performed within the workstation controller. In particular, certain keyboard edit function keystrokes are processed by the workstation controller to permit the edit functions to be performed, without disturbing the position or display panel presentation of preselected edit mask characters.

6 Claims, 14 Drawing Sheets

Employee Information

Employee Name (last, first). . Smith, John

Social Security Number. . . . 123 45 6789

Home Phone Number. . . . . . 555 123 4567

Date of Employment. . . . . . 10 15 86

Start Time. . . . . . . . . . . 07 30 AM

PRIOR ART

FIG. 5

Employee Information

Employee Name (last, first). Smith, John

Social Security Number. . . . 123 - 45 - 6789

Home Phone Number. . . . . . ( 555 ) 123 - 4567

Date of Employment. . . . . . 10 / 15 / 86

Start Time. . . . . . . . . . . 07 : 30 : AM

PRIOR ART

FIG. 6

METHOD AND APPARATUS FOR CONSTRUCTING EDIT MASK ENTRY FIELDS WITH MULTIPLE NONPROGRAMMABLE TERMINALS ATTACHED TO A WORKSTATION CONTROLLER

BACKGROUND OF THE INVENTION

The present invention relates generally to computer workstations which are connected for information interchange with host or mainframe computer systems; more particularly, the invention relates to a method and apparatus for controlling the displayed position of entry field data on certain computer workstations by processing keystroke operations at the workstation without participation of the host processor to which the workstation is connected. Further, the invention enhances the user interface associated with certain types of entry fields.

In any typical prior art system utilizing a host processor and workstations, wherein the workstations are utilized for user interaction and access and the host processor is utilized for running application programs, the host processor provides certain fundamental information. For example, the host processor may generate a data stream containing information to be displayed on a workstation screen, and information for controlling the presentation and position of the data on the screen. The control and manipulation of each screen display panel is typically generated by the host processor, by transmitting a new data stream for each panel, wherein each data stream contains new presentation and position information. Specifically, for a dependent workstation (DWS), the host processor data stream is sent to a workstation controller (WSC), and the WSC provides the internal memory and control for directly controlling the display screen of the DWS. The host processor-constructed data stream is received by a workstation controller, and the workstation controller interface processes the data stream. The workstation controller may poll the workstation to determine whether a keystroke should be recognized or whether any of a predetermined number of commands have been accepted.

SUMMARY OF THE INVENTION

The present invention provides a method and apparatus for a host-based application program to construct edit mask entry fields for displaying panel data within specified screen areas at a nonprogrammable workstation, to better control the presentation of such entry fields, particularly when there is a need for character separation within entry fields, on account of the unique entry field data being presented. This is enabled by an extended data stream interface between the host processor and the workstation controller, including data which defines the position of separator characters within an entry field. The host application software uses the data stream conventions to position and define each separator character in the entry field, and the workstation controller arranges the presentation of the entry field on a workstation display screen with the separator characters included.

The entry field, with separator characters included, is treated by the WSC as a singular field when edit keys are actuated when the cursor is within the field.

It is another feature of the present invention to provide a storage area within the workstation controller so as to enable the transmission of edit mask entry fields in a conventional manner between the WSC and host processor, and to exclude transmission of all separator characters from entry field data sent from the workstation controller to the host processor.

It is the principal object of the present invention to provide edit mask entry fields in systems including a host processor and a plurality of workstations, including a plurality of dependent workstations which are connected into a host processor via a workstation controller.

It is another object of the present invention to enable a workstation controller to accept a data stream from a host processor which defines edit mask entry fields, to enable the WSC to control the presentation of the field segments and to return the non-masked entry field data to the host processor.

It is another object of the present invention to enable the workstation controller to enhance the dependent workstation user interface relative to editing of entry fields.

BRIEF DESCRIPTION OF THE DRAWINGS

The foregoing and other objects and advantages of the invention will become apparent from the following specification, and with reference to the claims and the appended drawings, in which:

FIG. 5 shows an example panel with multiple entry fields without mask characters according to the prior art;

FIG. 6 shows an example panel with multiple entry fields with mask characters according to the prior art;

DESCRIPTION OF THE PREFERRED EMBODIMENT DEPENDENT WORKSTATION

Figure 1:
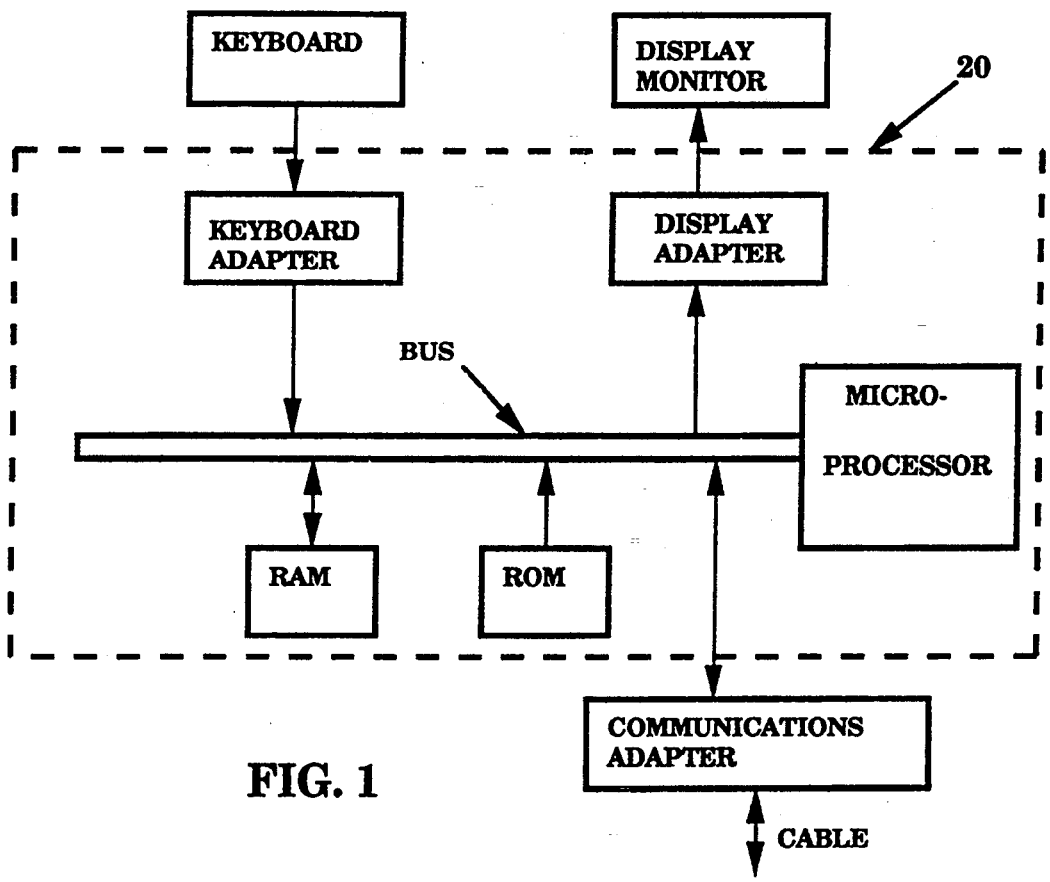
FIG. 1 shows a typical block diagram of a DWS.

FIG. 1 shows a typical block diagram of a DWS, wherein the circuits typically found within the framework are designated within dotted outline 20. The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the DWS and a workstation controller. The RAM is typically capable of 3-5 kilobytes of storage, for storing a screen buffer, and for providing a limited amount of memory work area for internal processing. The ROM is typically about 8 kilobytes in capacity, for storing coding relating to power-on processing, diagnostics, and character generation patterns and process communication protocols for communicating with other systems. The DWS is incapable of any significant internal processing beyond that which is required to interface with the keyboard and display monitor, and to communicate via the communications adapter. Therefore, all of the information displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC. In the preferred embodiment, the DWS shown in FIG. 1 is an IBM 5250 family display, although other equivalent types of DWS could be used.

In typical systems, the function of a "workstation controller" is to provide information transfer and control to a plurality of remote terminals from a single host processor. This workstation control interface function is usually performed by a hardware and software package which is uniquely identified and separate from the host processor hardware and software packages. The hardware for a workstation controller is typically contained on a circuit board package or packages which is pluggable into a host processor card slot, and the software for a workstation controller is typically executed by the hardware independently of software which is executed by the host processor.

If a workstation controller is physically remotely positioned from the host processor, its communications with the host processor are made via a communication line, connected in a manner similar to the connection of various other remotely located devices. If the workstation controller is physically incorporated into the host processor mainframe as a pluggable card, the workstation controller may communicate with the host processor utilizing the normal channel connections associated with the host processor.

Figure 2:
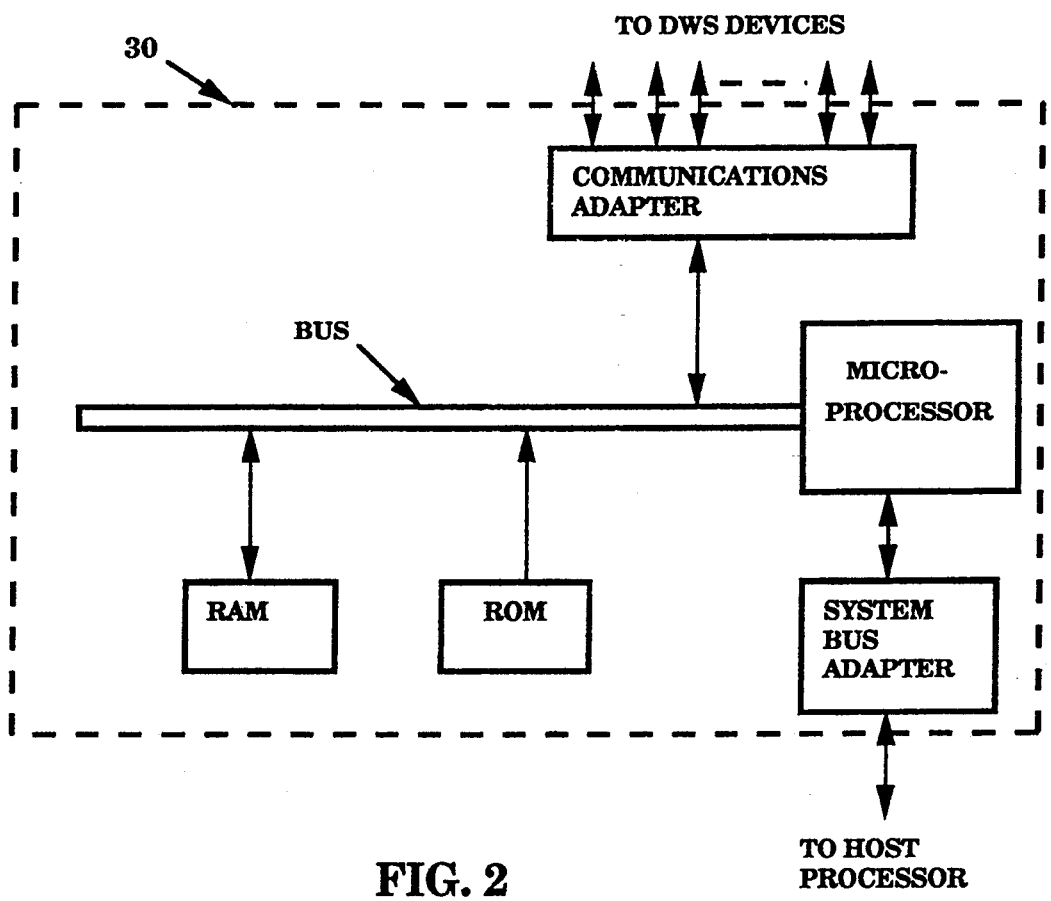
FIG. 2 shows a typical block diagram of a workstation controller.

FIG. 2 shows a typical block diagram of a workstation controller, of the type which typically communicates with a plurality of DWS devices. The workstation controller has a number of circuits contained within a package designated by dotted outline 30, and a microprocessor which is typically an Intel type 80826 circuit chip, or equivalent. The WSC microprocessor is typically connected to a system bus adapter which itself may communicate with a host computer processor. The WSC also has an internal data bus and a RAM having a capacity of 0.5-2.0 megabytes, and a ROM having a capacity of about 16 kilobytes, containing coding for initializing the WSC and for diagnostics relating to the WSC. The internal data bus of the WSC is connected to a communications adapter, which is externally connected to a "fan-out" multiplexer for enabling a plurality of DWS devices to communicate with a single WSC. In a typical application, the fan-out circuits are connectable to up to 40 DWS devices. Keystroke signals from all of the DWS devices are received by the WSC and stored within the RAM, for subsequent communication to the host processor or for internal processing by the WSC. In the preferred embodiment the WSC of FIG. 2 is a "feature card" for an AS/400 computer system, wherein the microprocessor is suitably programmed.

Figures 3, 7:
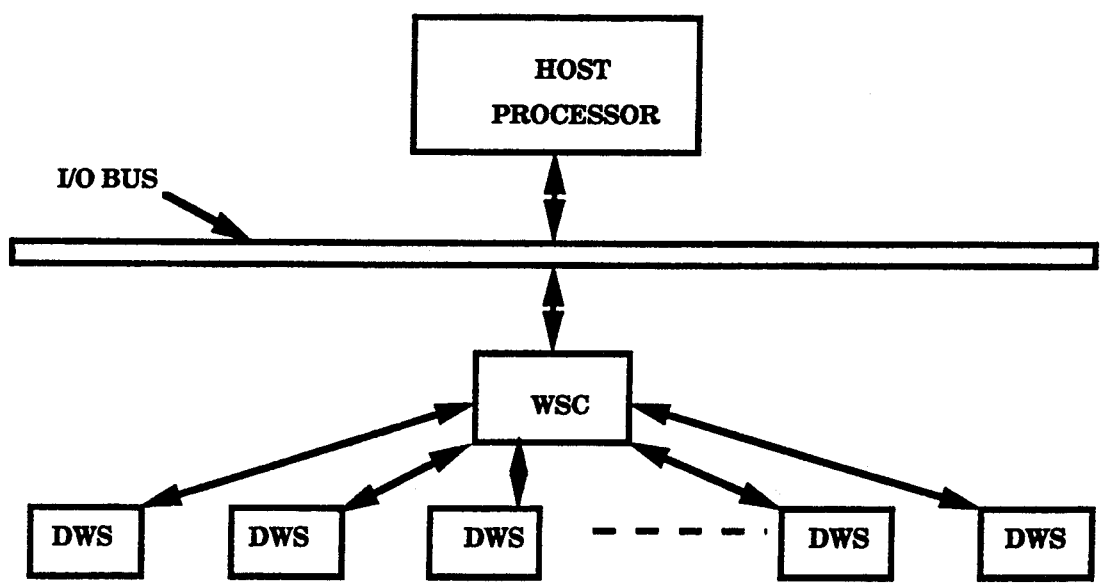
FIG. 3 shows a typical block diagram of a plurality of DWS devices connected to a host computer via a WSC.
FIG. 7 shows an example panel using edit mask entry field features according to the invention.

FIG. 3 shows a typical block diagram of the system interconnections, wherein the host processor communicates with a WSC via an I/O bus, and a WSC communicates with up to 40 DWS devices via communications cables. Other devices and controllers may be connected to the I/O bus for communication with the host processor. In the preferred embodiment, the host processor is part of an AS/400 computer system.

Under typical operating conditions in the prior art, the host processor will construct a data stream for each of the terminals to which it is connected, the host processor will then transfer the data stream representative of each screen display and entry field definitions to the WSC, where entry field definitions are retained and the display screen is temporarily retained within a section of RAM identifiable with each particular DWS. The WSC then transfers the screen display data to the specific DWS device. Each DWS device contains sufficient internal storage to retain the screen display data for purposes of presenting the display image to the user. If a DWS user makes a keystroke, the DWS signals the WSC that the DWS has keystroke data available. The WSC makes the transfer of this keystroke data when polling the DWS.

Figure 4:
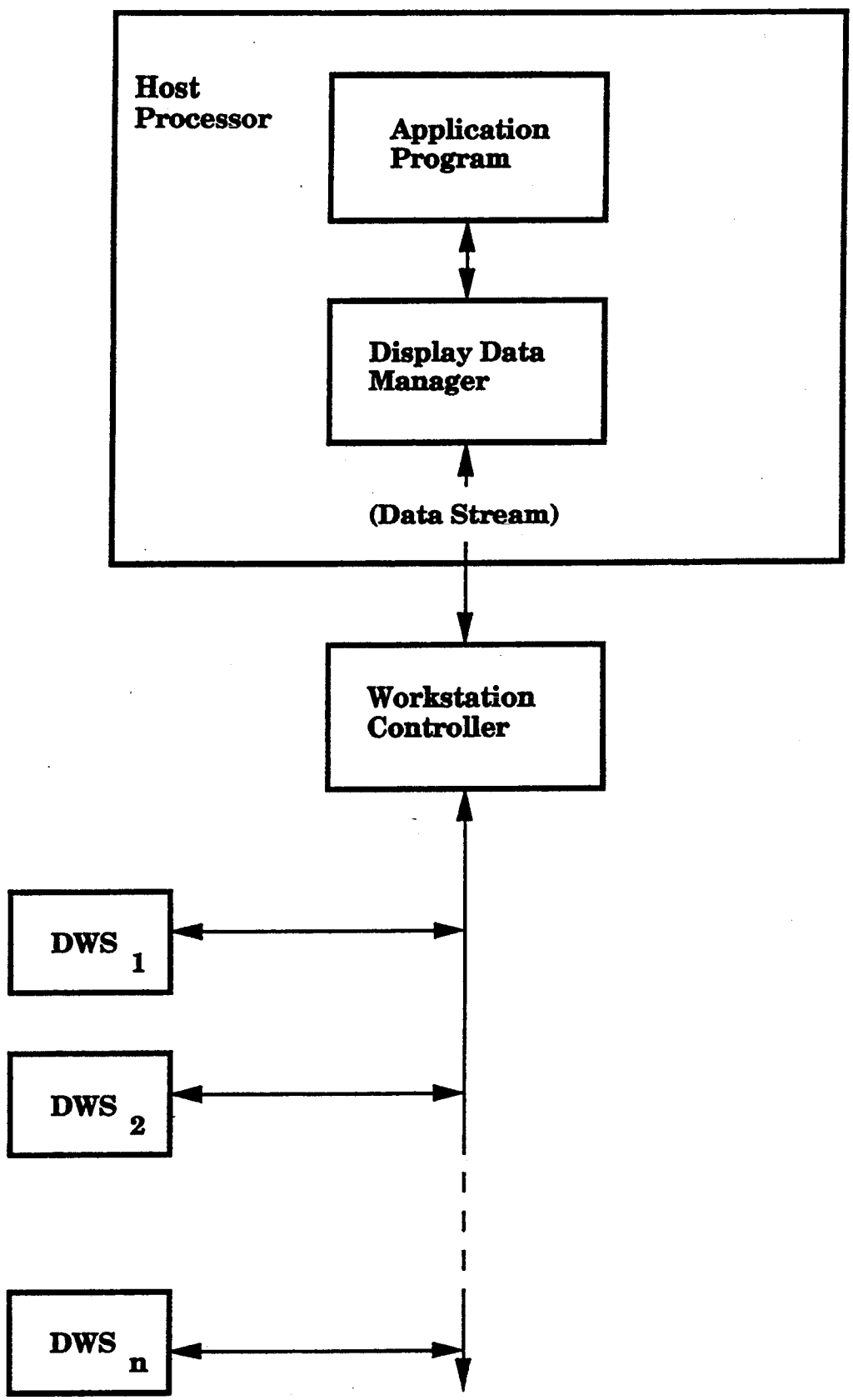
FIG. 4 shows a simplified diagram illustrating display data flow in a system having DWS terminals.

FIG. 4 shows a simplified diagram to illustrate the display data flow in a system having DWS terminals. The host processor executes application programs as a part of its normal operating function. These application programs communicate, from time to time, with the remote terminals connected in the system, either by processing keyboard data sent from the terminals or by generating display information to be transmitted to the terminals for display. When an applications program needs to communicate with a remote terminal it calls up an applications program interface routine, one form of which is identified as a "display data manager." When information is to be displayed at a remote terminal, the display data manager constructs a data stream according to a particular format, and transmits this data stream to a workstation controller. The workstation controller selectively interacts with all of the DWS devices, selectively activating the appropriate device and then passing the information to be displayed onto the selected DWS device.

The specific programming requirements for communicating between a workstation controller and a typical host computer processor, is described in IBM Publication No. SA21-9247-6, entitled "IBM 5250 Information Display System—Functional Reference Manual." This information is incorporated by reference herein, as a disclosure of the required programming formats and data interchange. However in addition to the disclosure therein, the present invention requires implementation of additional processes which may be incorporated into the software of the workstation controller. In particular, the present invention is useful in solving entry field problems inherently related to the need for data entry templates, or masks, over entry fields to control the entry of data to specific entry formats.

FIG. 5 shows an example of a panel display according to one form of teaching in the prior art; namely, the display of multiple entry fields without mask characters.

In this example, the social security number portion is three separate entry fields of character lengths 3, 2 and 4 characters, respectively. Each entry field has a leading attribute which takes a screen position, and the attribute is "protected," i.e., the user cannot enter a character at that position. The first social security number entry field is shown with the entry "1, 2, 3" the second entry field is shown with the entry "4, 5" and the third entry field is shown with the entry "6, 7, 8, 9". Information which is entered or modified in any of these entry fields will be separately transmitted to the host processor, and the host processor must therefore maintain the intelligence to recognize that the social security number information requires dealing with three different entry fields. Furthermore, if a new social security number were entered into the panel, it would require the user to make three separate entries, thereby increasing operator time for a relatively simple entry operation. Furthermore, if the selection cursor is advanced through the panel, it will successively move from the first social security entry field, to the second, to the third, and then down to the next panel entry field, etc. This increases the number of cursor movement keystrokes required to move the cursor across the panel.

The "home phone number" entry fields are likewise three separate entry fields, divided as shown in FIG. 5. The "date of employment" entry fields and the "start time" entry fields are also each divided into three entry fields. It therefore is apparent that a significant number of operator keystrokes is required for entry of information, revision of information, or cursor movement in connection with the display panel of FIG. 5. In the case of each entry field the host processor must have sufficient intelligence and storage space to deal with the selected combinations of entry fields, in order to process the different types of information according to their respective needs.

FIG. 6 shows an example of another prior art display panel utilizing multiple entry fields with mask characters incorporated into the entry field definitions. For example, the "social security number" involves five entry fields, each of which has a leading attribute which occupies a screen position and appears as a space on the panel display. The entry "1, 2, 3" fills the first entry field, the mask character "—" fills the second entry field, the entry "4, 5" fills the third entry field, the mask character "—" fills the fourth entry field, and the entry "6, 7, 8, 9" fills the fifth entry field. The mask characters will prevent entry of information at the mask character locations, thereby preserving the "—" characters, but the display of information in the entry field of FIG. 6 is spread over a greater number of character positions. This technique therefore utilizes valuable character display space on the panel, and therefore limits the total amount of information which can be displayed on the panel. In addition, the panel of FIG. 6 suffers from the same disadvantages as the panel of FIG. 5, concerning the problem of entry of information, processing of information, and modification of information in the various entry fields.

FIG. 7 shows an example of a panel display which is constructed according to the teachings of the present invention. In this example, edit mask fields are used for each of the four numeric entry fields shown. Using the "home phone number" entry field as an example, the host applications program would construct this entry field using the following representative instructions:

Entry Field (Position=Row 12, Column=40) (Length=13) (Numeric Only) (Edit Mask: Position 1, "("; Position 5, ")" Position 9, "—"), The foregoing definition is incorporated into the data stream transmitted by the host processor to the workstation controller, to enable the workstation controller to not only construct the entry field according to the described information, but also to save the entry field definition in its own memory for further reconstruction as the panel information is utilized. The workstation controller will automatically write the mask characters into the entry fields when the display panel is initially written.

Figure 8A:
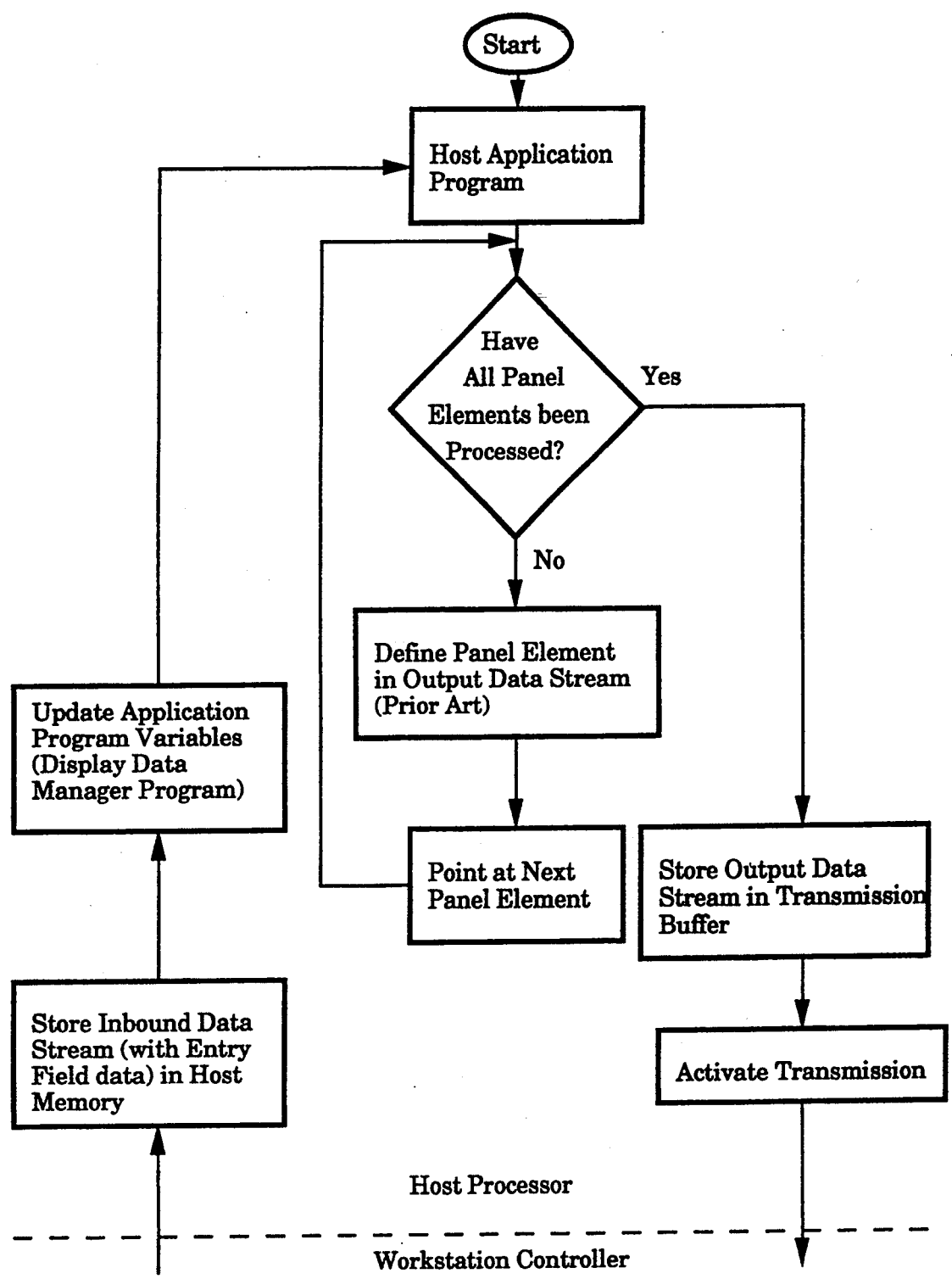
FIGS. 8A and 8B show a flow chart illustrating prior art host and workstation controller processing for display panels.
Figure 8B:
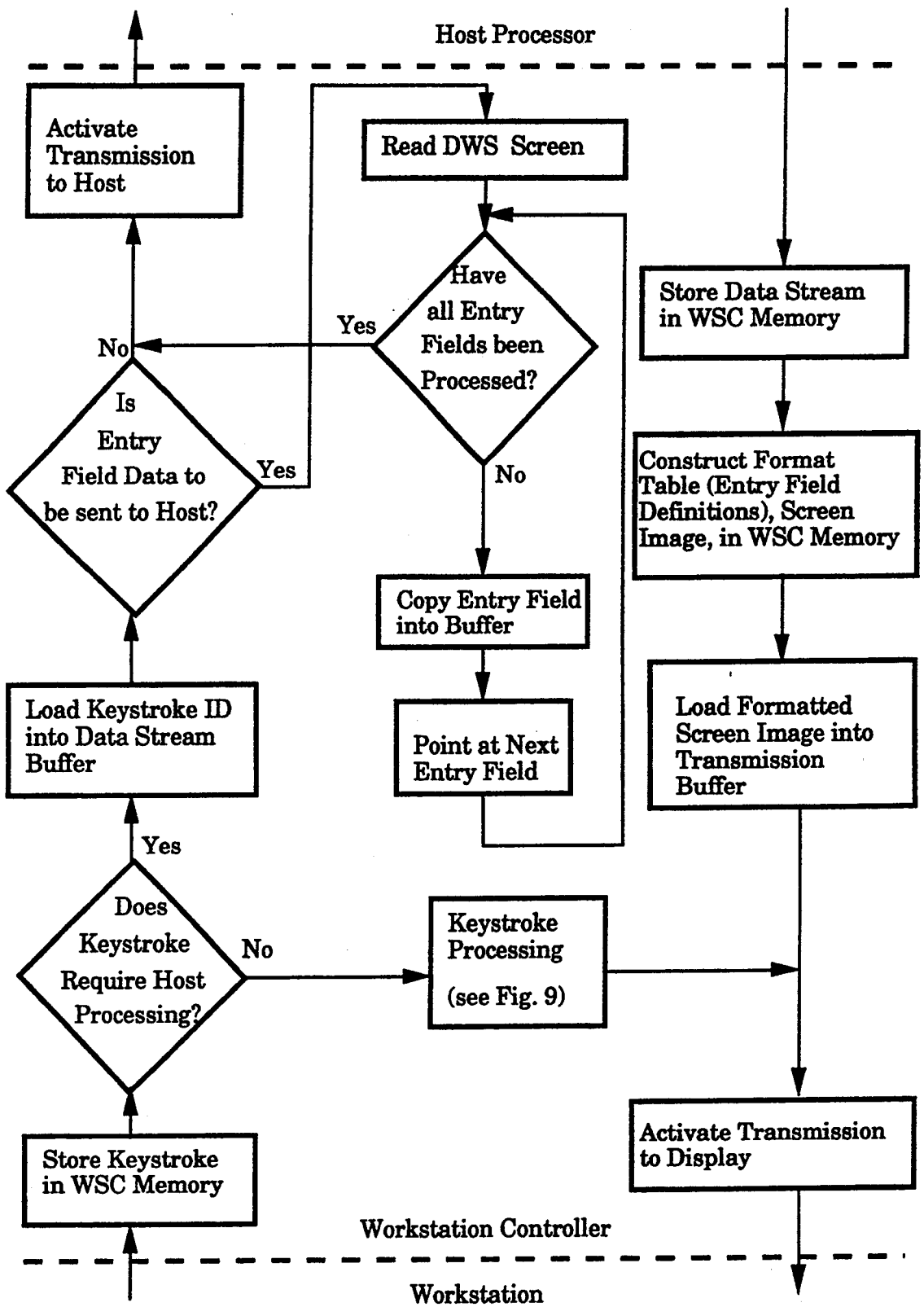

FIGS. 8A and 8B are flow charts illustrating the host and workstation controller processing of display panels according to the prior art. For purposes of the flow charts illustrated in FIGS. 8A and 8B, and for the subsequent flow charts illustrated herein, it is presumed that the overall computer system is organized according to the diagram of FIG. 4. In other words, a host processor controls the execution of one or more applications programs, and the applications programs are executed in concert with display data manager software for purposes of communicating with a plurality of terminals. The terminals may be located at positions which are remote from the host processor, and the communication takes place via cables connected between all of the terminals and a workstation controller, which is connected to communicate with the host processor. The vehicle for communication is a 5250 data stream, which is constructed and transmitted according to techniques which are well known in the prior art. A feature of the 5250 data stream is that it incorporates not only the identification and control signals required for activating any of the connected remote terminals, but also that it conveys the necessary keyboard and/or display information which is associated with specific remote terminals. Transmissions from the remote terminals back to the host processor are also conveyed via 5250 data streams, which are constructed within the workstation controller. A feature of the workstation controller in the prior art is that, whereas it serves as a communications interface between host processors and remote terminals, it performs very few independent logical control and decision making functions. Therefore, many keystrokes from user at any of the plurality of terminals are passed via the workstation controller to the host processor for recognition and response, and a display message created within the host processor is communicated via the workstation controller to the selected remote terminal. The present invention enables the workstation controller to perform more of the logical and decision making functions relating to each of the display screens to which it is connected, and to assist in the editing functions performed by the user at any of the remote terminals to which it is connected.

FIG. 8A shows the flow chart for prior art processing within the host processor. The display data manager program receives an inbound 5250 data stream from the workstation control interface. This inbound data stream may include information relating to recent keystrokes made by the user at a remote terminal; the inbound data stream is transferred into memory locations within the host processor for the application program. The host application program then analyzes the data to process the information contained therein, by examining the data associated with each of the display screen entry fields, and process the information according to the particular application software being executed. As a result of this processing, the host application program defines a list of panel elements and the display data manager program constructs a new output data stream which includes data for each display panel element affected by the received inbound data. After the host application program has defined all of the panel elements, and the display data manager program has completed the necessary processing steps, it stores the newly-constructed 5250 data stream in a transmission buffer, and activates a transmission of this data stream to the workstation controller.

FIG. 8B illustrates the prior art processing activities which occur within the workstation controller. An output 5250 data stream which has been transmitted from the host processor to the workstation controller is initially stored in memory locations within the workstation controller. The workstation controller then constructs a format table to define display entry fields (start and end locations), screen images, etc., and stores this information in its memory; it then loads the formatted screen images into a transmission buffer and activates a transmission to the terminal. The selected remote terminal processes this information according to techniques well known in the art, with a result that the terminal display screen receives a new or modified image as dictated by the host application program.

When an operator keystroke is made, the terminal transmits this keystroke information to the workstation controller, which stores it in memory. The workstation controller then makes an initial determination whether the keystroke requires processing by the host application software. If it does not, the workstation controller performs the processing according to the flow chart shown in FIG. 9. If the keystroke requires further processing by the host application software the keystroke information is loaded into a data stream buffer. If the keystroke information does not contain entry field data required to be sent to the host processor, the information is immediately transmitted to the host processor. If the keystroke information does include entry field data, the workstation controller will "read" the display screen information contained at the remote terminal by sending a "read" command to the remote terminal. The remote terminal returns the requested display screen data; the workstation controller stores the read data in a temporary buffer for processing. The workstation controller examines this information to process all entry fields found on the display screen. After all the entry fields have been examined and loaded into a buffer memory, the workstation controller activates a transmission to the host, so that the host application software may receive all entry field information for its own processing needs.

Figure 9:
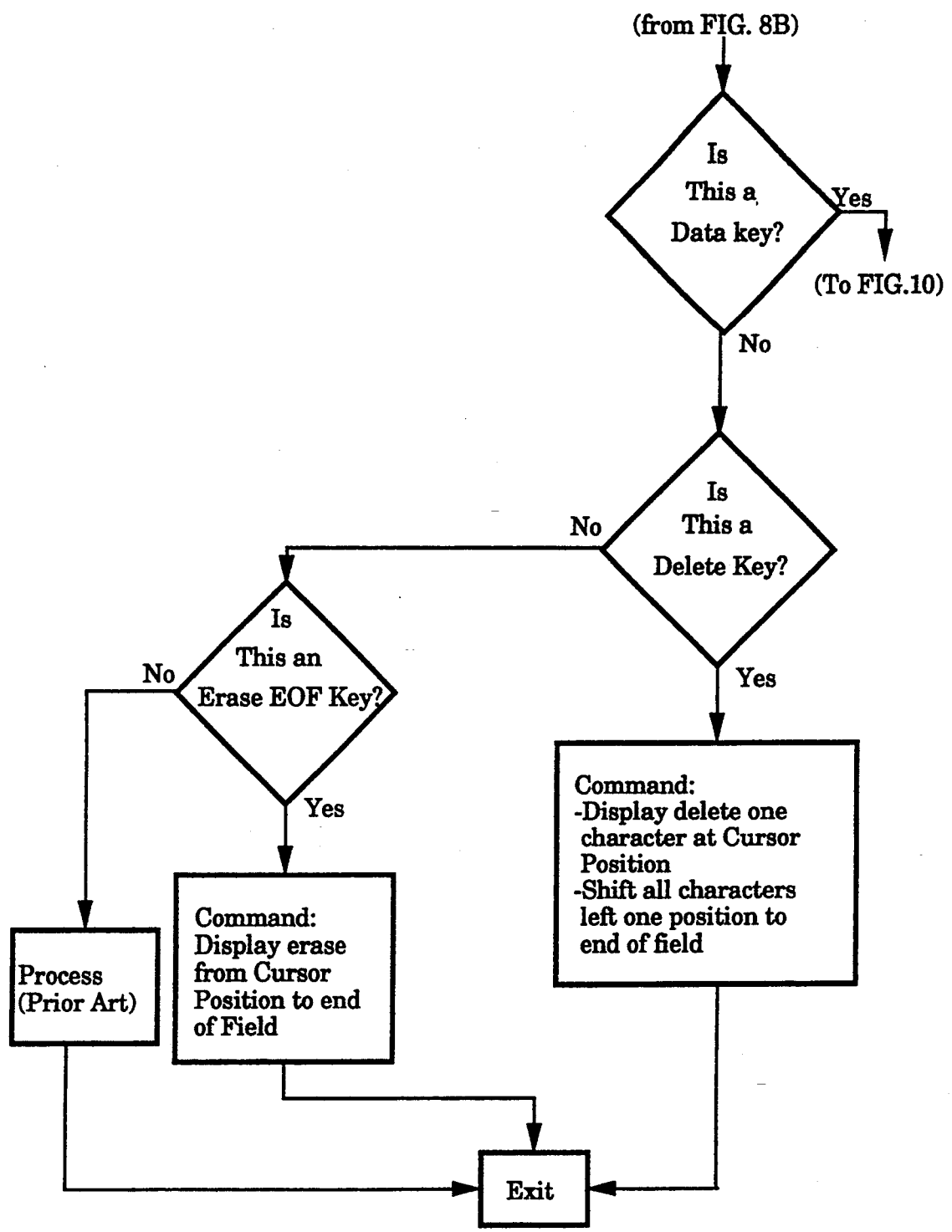
FIG. 9 shows a flow chart of prior art keystroke processing.
Figure 10:
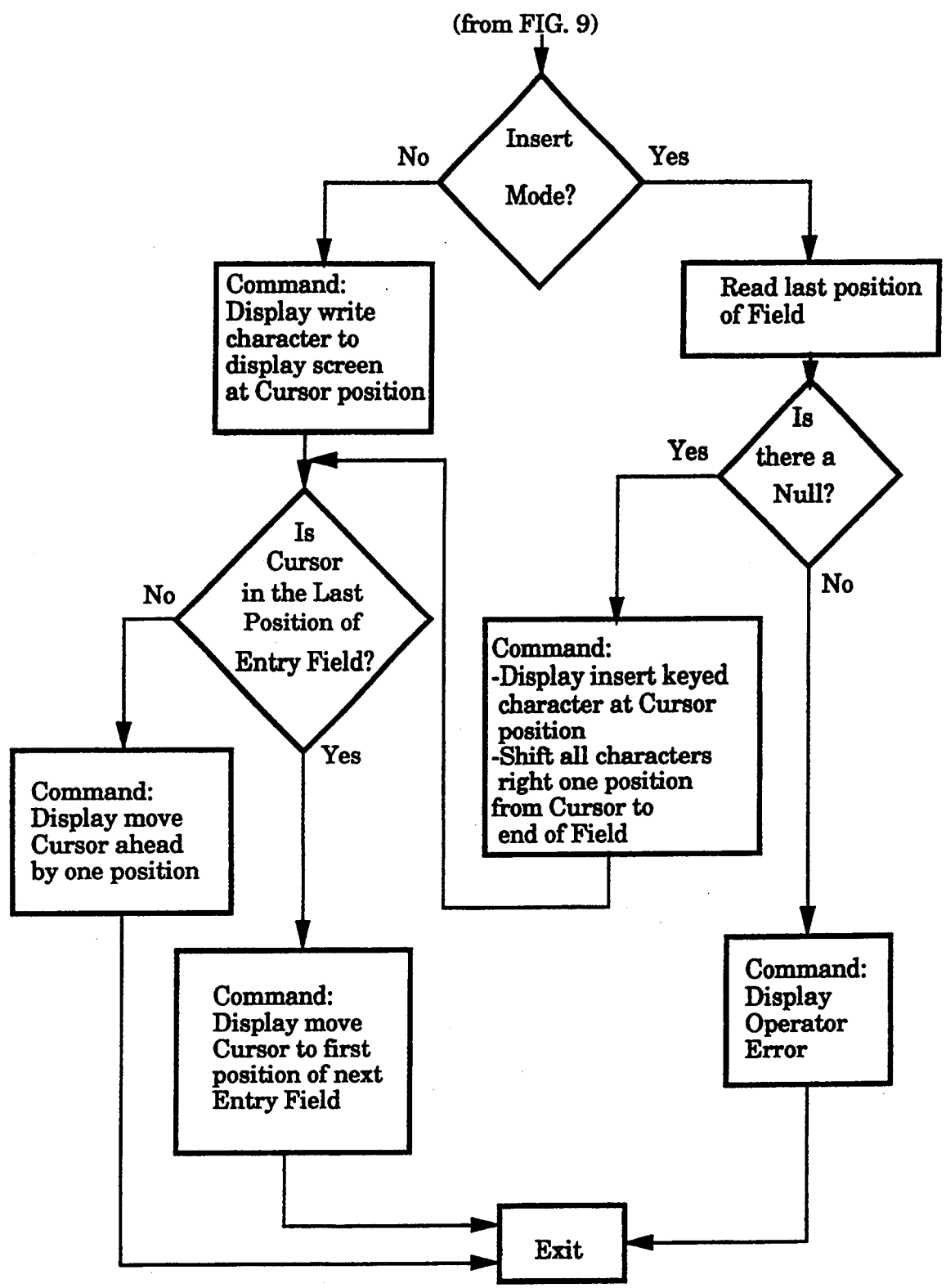
FIG. 10 shows a flow chart of prior art keystroke processing.

FIG. 9 and FIG. 10 are flow charts of keystroke processing which may be performed within the workstation controller, for certain keystroke operations. For example, if a keystroke operation is a data key keystroke the flow chart of FIG. 10 applies; if the keystroke was not a data key the flow chart of FIG. 9 applies, and it first determines whether the keystroke was a delete key. If the keystroke was not a delete key, the workstation control interface next determines whether the keystroke was an "erase end of field" (erase EOF) key. If not, the workstation control interface processes the keystroke according to prior art techniques. If so, the workstation controller generates a command to the workstation terminal to cause the terminal to erase the character at the current cursor position, and to erase all subsequent characters to the end of the entry field. If the workstation controller determines that the keystroke was a delete key, it issues a command to the workstation terminal to cause the terminal to delete one character at the cursor position, and to left-shift all subsequent characters to the end of the entry field.

FIG. 10 shows the flow chart for processing keystrokes which are data key keystrokes. The workstation controller first determines whether the workstation is in an insert mode. If it is, it examines the last position of the field to determine whether a null character exists at that position by issuing a "read" command to the terminal and waiting for the returned byte. If there is no null character the workstation controller commands the workstation terminal to display an operator error message which indicates the insert is not allowed. If there is a null character at that position, the workstation controller issues a command which causes the terminal to insert the keyed character at the cursor location, and to shift all subsequent characters to the end of the field one position to the right.

If the workstation controller determines that the terminal is not in an insert mode, it issues a command to cause the workstation to write the keyed character on the display screen. It next determines whether the newly-written character occupies the last position of an entry field; if it does not, it issues a command to move the display screen cursor ahead by one position. If the displayed character does occupy the last position of an entry field, the workstation controller issues a command to cause the terminal to move the cursor to the first position of the next entry field.

The foregoing illustrations, with reference to FIGS. 8–10, illustrate the types of keystroke processing which may occur within a prior art workstation controller. The present invention simplifies and enhances the interaction between the host application program and the display terminal, particularly with reference to entry fields, to provide an enhanced degree of control and display function with respect to these fields. This enhancement will be described with reference to FIGS. 11–13.

Figure 11A:
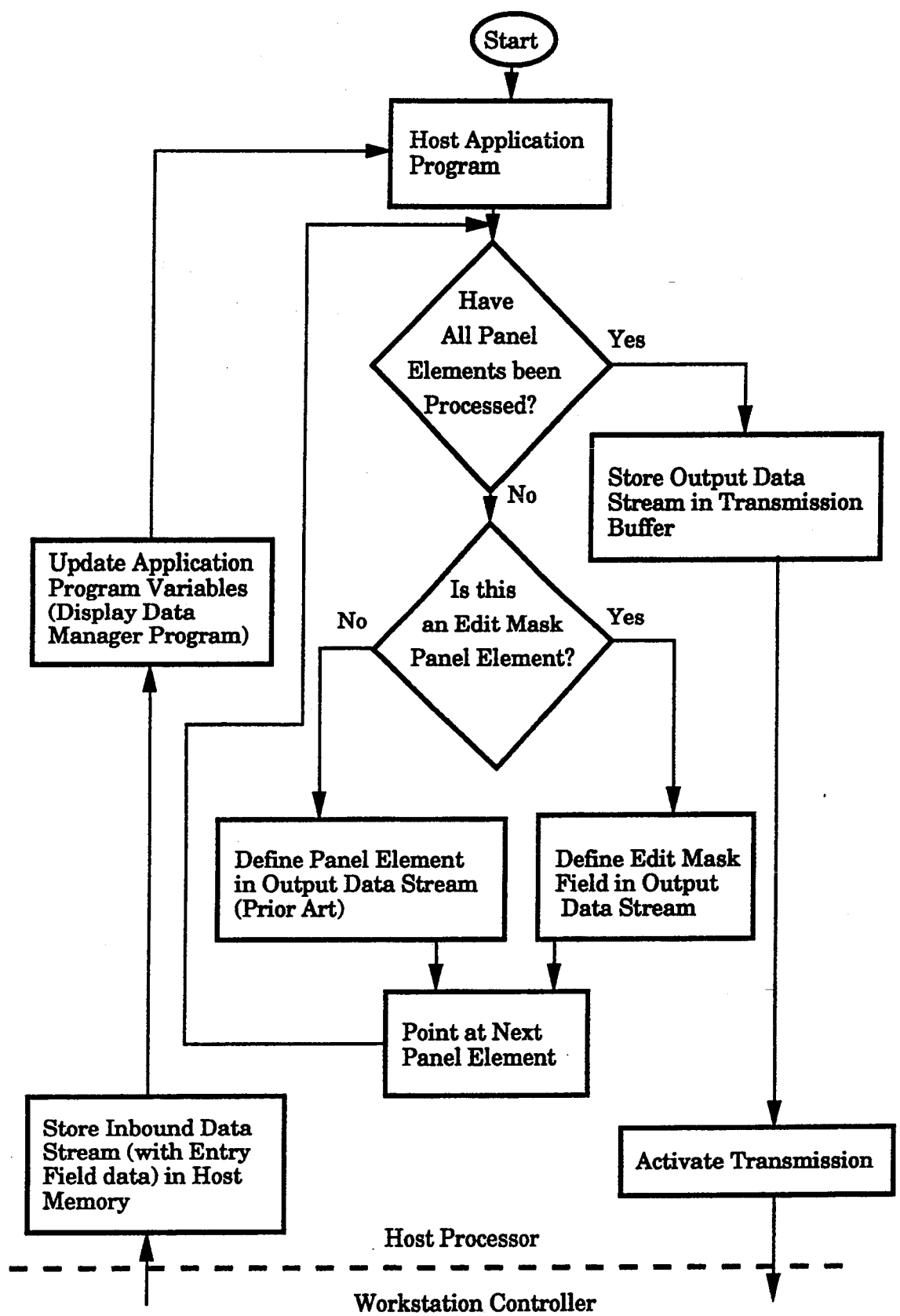
FIGS. 11A and 11B show a flow chart of host and workstation controller processing according to the invention.

FIG. 11A shows a flow chart for processing within the host processor, according to the teachings of the present invention. The display data manager program receives an inbound 5250 data stream from the workstation controller. This inbound data stream may include information relating to recent keystrokes made by the user at a remote terminal; the inbound data stream is transferred into memory locations within the host processor. The display data manager program and the host application program then analyze the inbound data to process the information contained therein, by examining the data associated with each of the display screen entry fields. The application program defines panel elements for the next display screen and the display manager program constructs an output data stream. With respect to each element of data being examined, the host data manager program determines whether the element is an edit mask panel element. If it is not, the data is processed according to prior art teachings; if it is, the host processor defines and distinguishes the entry field as an edit mask entry field with pairs of a mask character and a mask position within the entry field, so that it may be preserved in constructing a suitable output data stream.

It should be recognized that, when the host application program constructs a first output data stream for an initial display at a remote terminal, the entry fields and the edit mask elements must be wholly defined, in order that these elements may be identified in the workstation controller when the data stream is disassembled.

After the host processor has assembled a data stream, either in response to an incoming keystroke or as a result of initially constructing a data stream for a remote terminal screen display, it stores the data stream in an output transmission buffer, and activates transmission of the data stream to the workstation controller. This data stream incorporates markers not only indicating the end points of entry fields, but also contains markers indicating the edit mask elements.

Figure 11B:
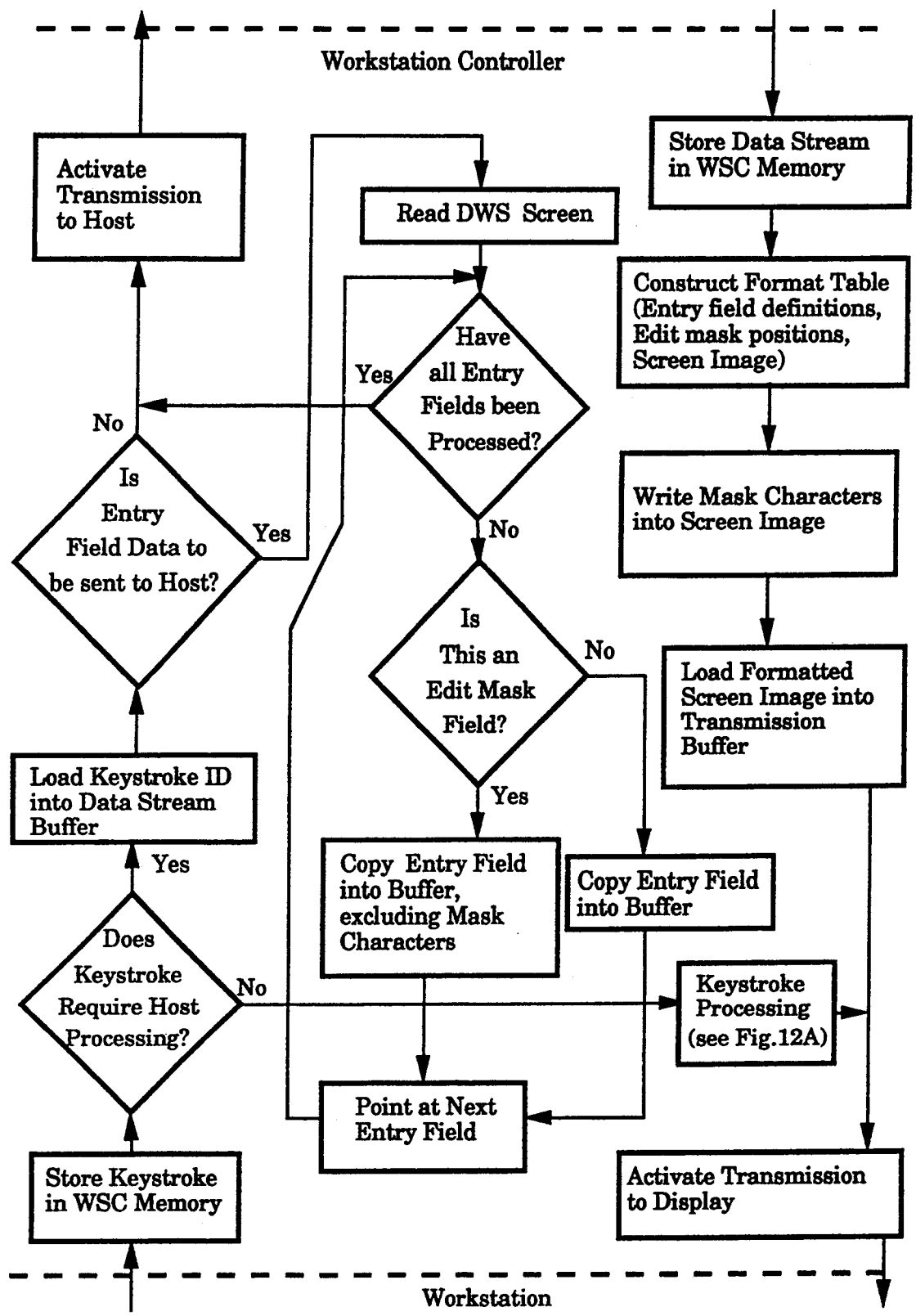

FIG. 11B illustrates the processing activities which occur within the workstation controller according to the teachings of the present invention. A 5250 data stream which has been transmitted from the host processor to the workstation controller is initially stored in memory locations within the workstation controller. The workstation controller then constructs a format table to define display entry fields (start and end locations, and mask characters and positions for an edit mask entry field), screen images, etc., and stores this information in its memory; it then writes mask characters into the screen panel display image and loads the formatted screen images into a transmission buffer, and activates the transmission to the terminal. The workstation controller performs some validation checking on edit mask entry fields; making sure mask positions are within the entry field and the field contains at least one non-mask position. The terminal processes the information according to techniques well known in the art, with the result that the terminal display screen receives a new or modified image as dictated by the host application program, and this image includes the entry fields with edit mask characters positioned according to the layout determined by the host application program.

When an operator keystroke is made, the terminal transmits this keystroke information to the workstation controller, which stores it in memory. The workstation controller then makes an initial determination whether the keystroke requires processing by the application software. If it does not, the workstation controller performs the processing according to the flow chart shown in FIG. 12A. If the keystroke requires further processing by the host application software, the keystroke information is loaded into an inbound data stream buffer. If the keystroke information does not contain entry field data required to be sent to the host processor, the information is immediately transmitted to the host processor. If the keystroke information does include entry field data, the workstation controller will "read" the display screen information contained at the remote terminal, by sending a "read" command to the terminal; the terminal returns the requested display screen data, and the workstation controller stores this data in a temporary buffer for processing. In determining whether all entry fields displayed have been processed, the workstation controller examines each entry field to determine whether it has edit mask characters; if it does not, the entry field is copied into a buffer and the next entry field is examined. If it does, the entry field is copied into the buffer, without the mask characters, and the next entry field is examined. After all entry fields have been processed, the workstation controller activates a transmission to the host processor, as before.

Figure 12A:
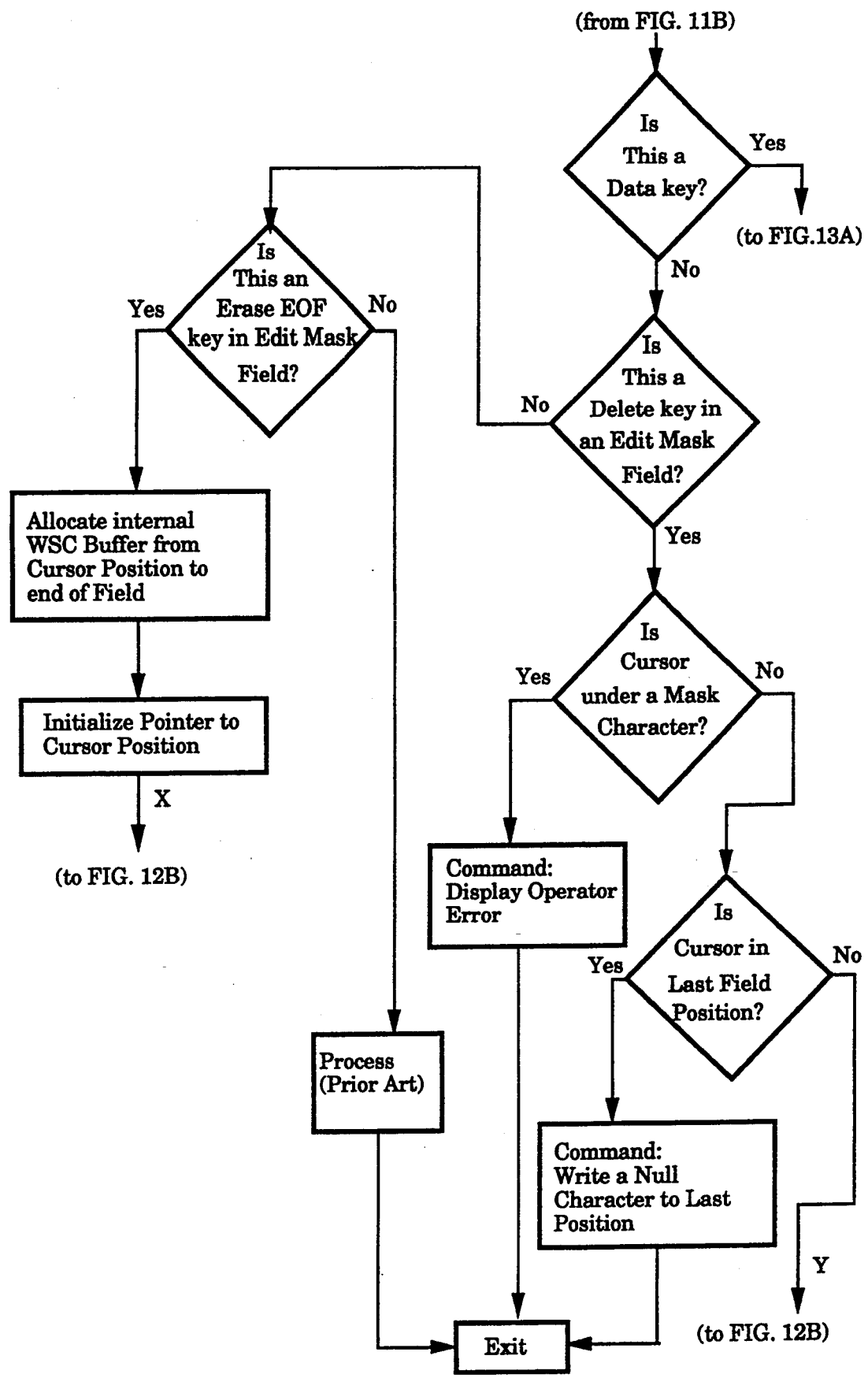
FIGS. 12A and 12B show a flow chart of keystroke processing according to the invention.

FIG. 12A illustrates a flow chart of keystroke processing which may be performed within the workstation controller, for certain keystroke operations. This processing is similar to that described with respect to the prior art, although the processing requires the workstation controller to perform unique operational steps with respect to edit mask entry fields. If the keystroke is a data key keystroke, processing is described in FIGS. 13A and 13B, to be hereinafter discussed.

Assuming the keystroke is not a data key keystroke, it must be determined whether the keystroke was made in a field having edit mask characters. To make this determination, it is first decided whether the keystroke was a Delete keystroke in an edit mask field; if it was not, it is next determined whether the keystroke was an Erase EOF keystroke in an edit mask field. If neither of these is the case, the processing continues according to the teachings of the prior art, as have been earlier described. Except, some keystrokes act somewhat differently when depressed within an edit mask entry field; for example, the field advance key moves the cursor to the next entry field, and if the next entry field is an edit mask entry field, the cursor moves to the first non-masked position in the field. The field exit key acts much like an erase EOF key in that mask positions are not erased.

Figure 12B:
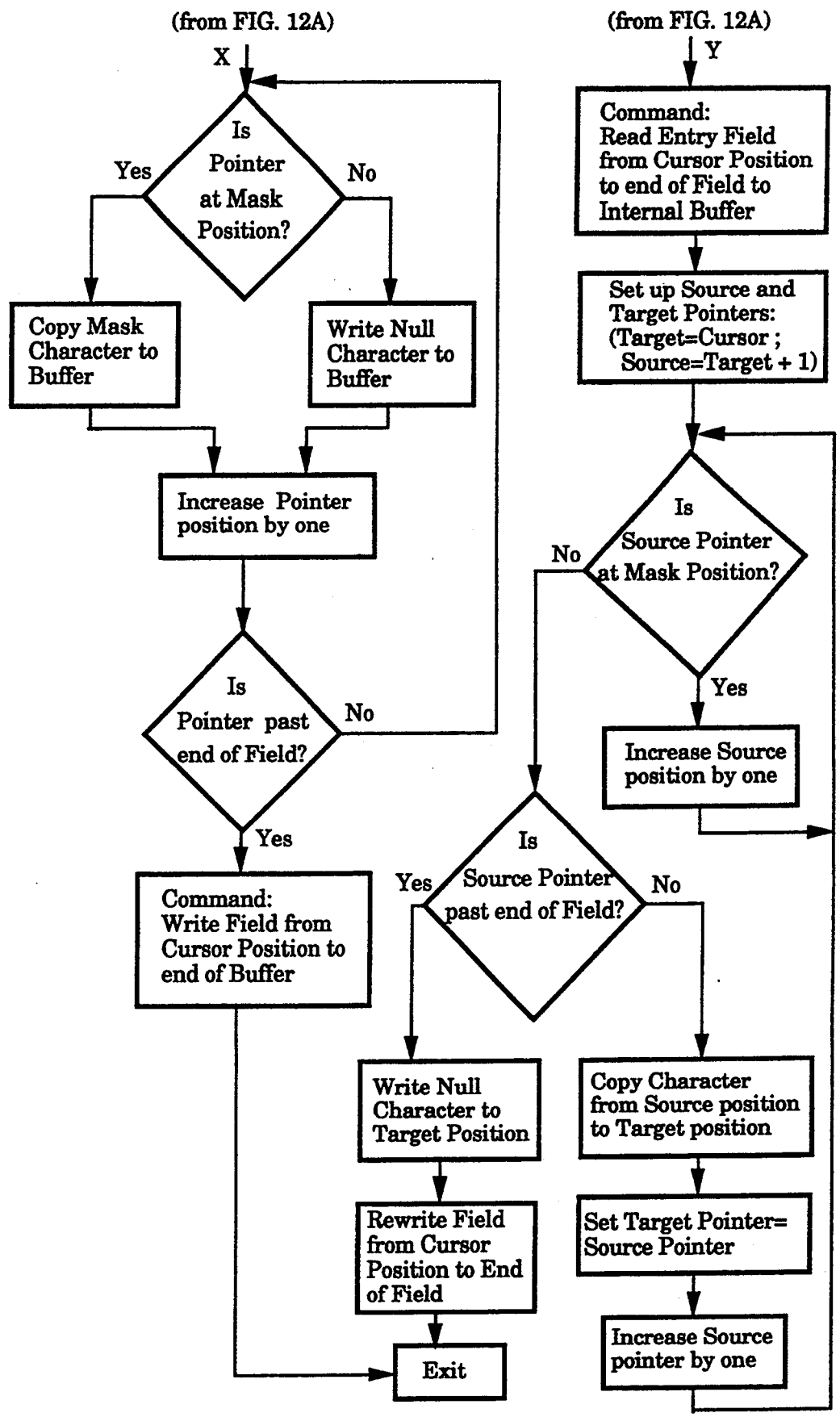

Assuming the keystroke was a delete key in an edit mask field, it is next determined whether the cursor is positioned under a mask character; if it is, a command is sent to the display to indicate an operator error condition which indicates delete is not allowed. If the keystroke is not under a mask character, it is determined whether the cursor is in the last position in the field; if it is, a command is sent to the display to write a null character at this last position. If the keystroke is not in the last field position, the processing continues as illustrated in FIG. 12B, at the point labeled "Y". First, a command is sent to the display to read the entry field, from the cursor position to the end of the field, and to store this portion of the entry field in a buffer memory. Next, a pair of pointers are created; a target pointer is set to the cursor position, within the buffer, and a source pointer is set to the target position plus one. It is next determined whether the source pointer is at a mask character position, and if it is the source pointer position is increased by one and reexamined. This process continues until the source pointer is no longer at a mask position, wherein a determination is made as to whether the source pointer is past the end of the entry field. If the source pointer is past the end of the entry field a null character is written at the target pointer position and the entry field is rewritten from the cursor position to the end of the field.

If the source pointer is not past the end of the entry field, the character at the source pointer position is moved to the target pointer position, the target pointer is set equal to the source pointer, and the source pointer position is increased by one. Once again, a determination is made whether the source pointer is at a mask position, as before, and the source pointer position is continually increased until it is not at a mask position. If the source pointer is not past the end of the field the character at the new source pointer position is copied to the new target pointer position, the target pointer is set equal to the source pointer, and the source pointer is increased by one position. This process repeats itself until the source pointer is past the end of the entry field, at which time a null character is written to the target pointer position and the entire field is rewritten from the cursor position to the end of the field.

In the event that the keystroke was an Erase EOF keystroke in an edit mask field, an internal buffer is allocated and a pointer is set to the cursor position within the buffer and processing continues as illustrated on FIG. 12B at point "X". It is first determined whether the pointer is located at a mask position; if it is, the mask character is copied from the format table to the buffer and the pointer position is increased by one. If the pointer was not at a mask position, a null character is written to the buffer and the pointer is increased by one. Next, it is determined whether the pointer is past the end of the entry field; if it is not, the preceding steps are repeated until such time as the pointer is past the end of the entry field. At this time, a command is sent to the display to write the field from the cursor position to the end of the buffer memory.

Figure 13A:
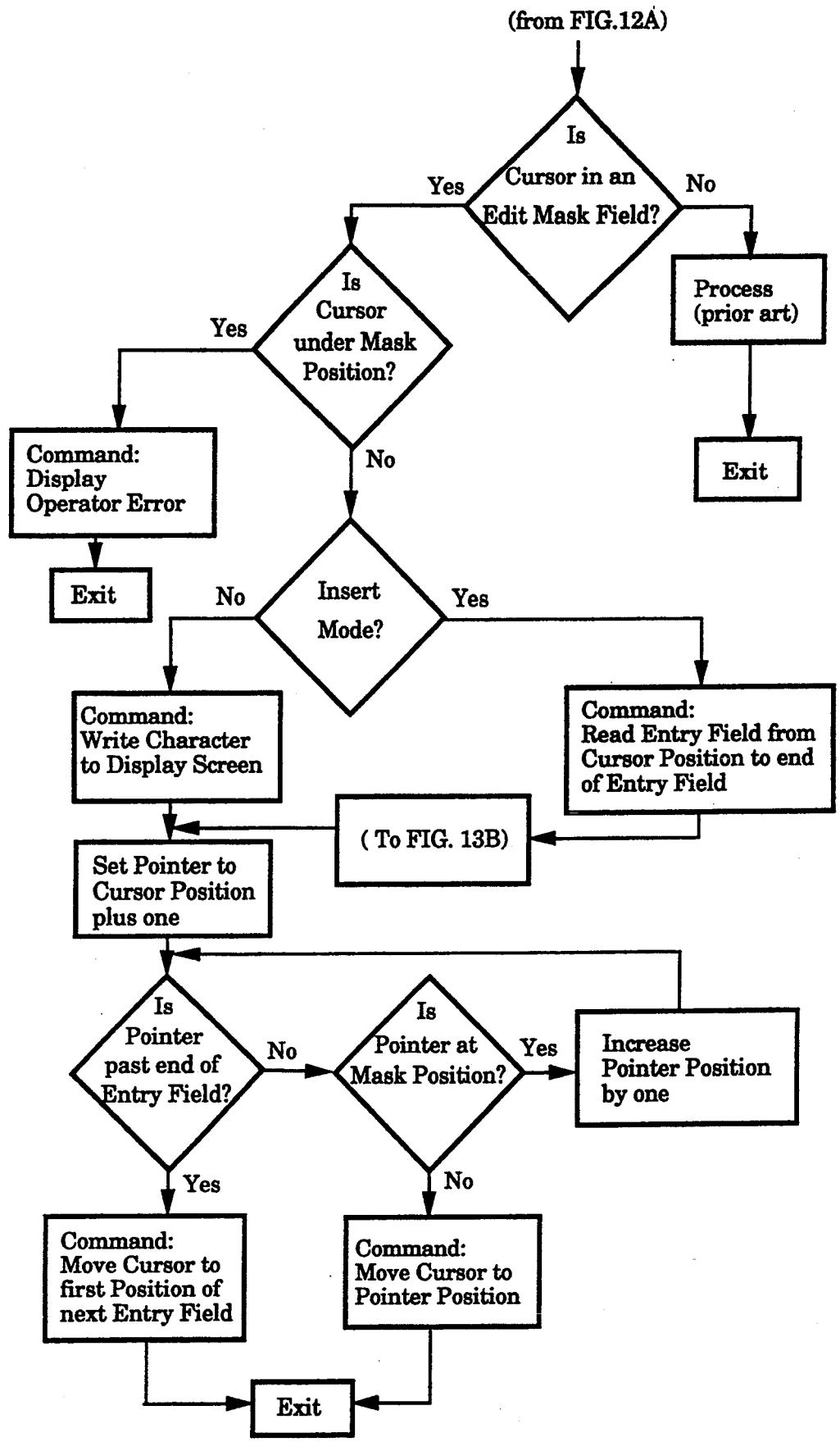
FIGS. 13A and 13B show a further flow chart of keystroke processing according to the invention.
Figure 13B:
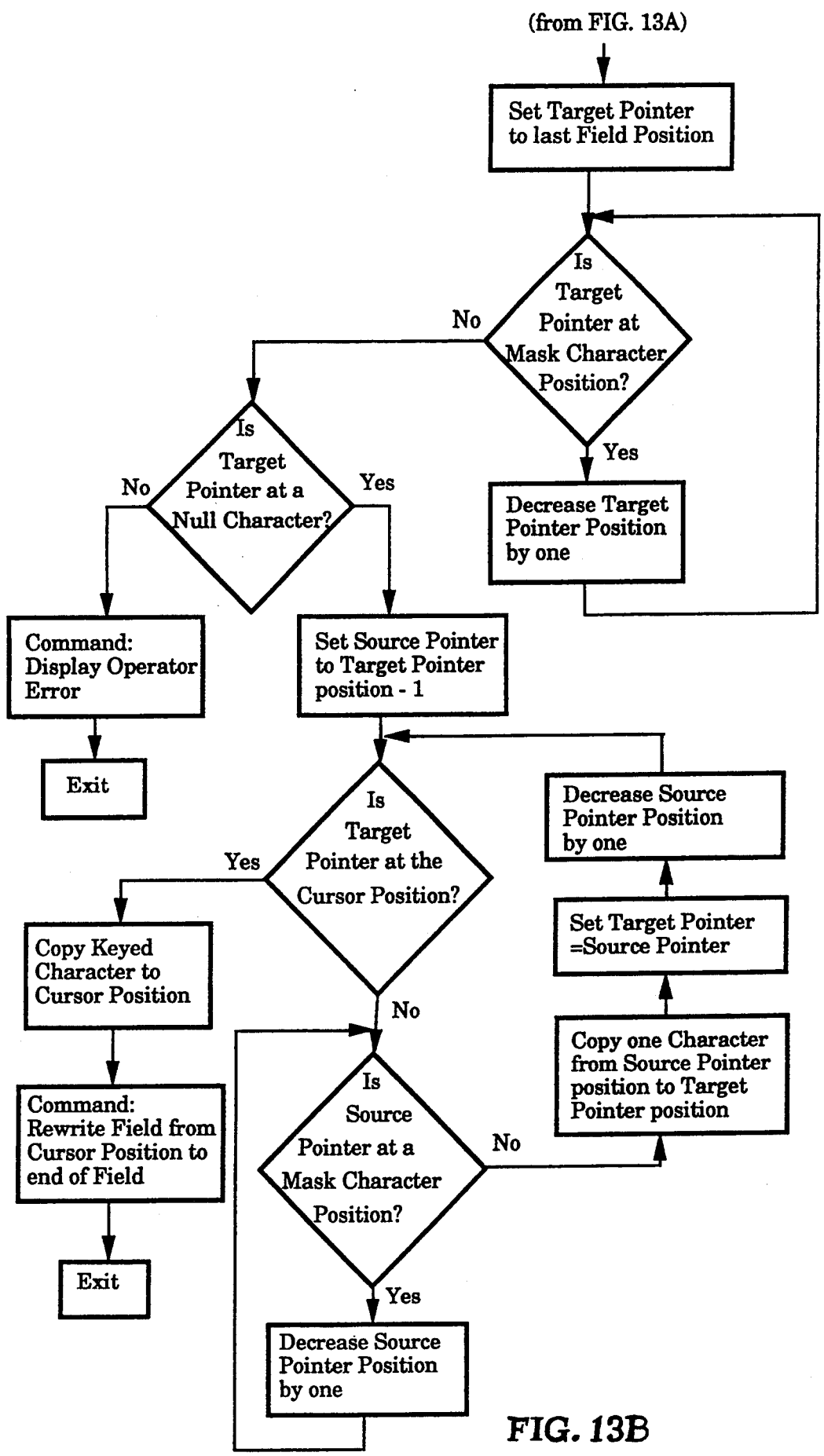

In the event the keystroke is determined to be a data key keystroke, processing is described in FIGS. 13A and 13B. First, it is determined whether the cursor is in an edit mask field; if it is not, processing occurs as is known in the prior art. If the cursor is in an edit mask field it is next determined whether the cursor is under a mask character position; if it is, a command is sent to the display to indicate an operator error, indicating data entry is not allowed. If the cursor is not under a mask position, it is next determined whether the display is an insert mode; if it is not, a command is issued to the display to write the keystroke character to the display screen. A pointer is then set to the cursor position plus one and it is determined whether the pointer is past the end of the entry field; if it is, a command is sent to the display to move the cursor to the first position of the next entry field. (If the next entry field is an edit mask field, the cursor moves to the first non-mask position). If the pointer is not past the end of the entry field, it is next determined whether the pointer is at a mask character position. If it is, the pointer position is increased by one and the foregoing sequence is repeated, until it is determined that the pointer is not at a mask position. In this case, a command is sent to the display to move the cursor to the pointer position.

If the determination as to insert is made, that the display is in insert mode, a command is sent to the display to read the entry field from the cursor position to the end of the entry field, into an internal buffer, and processing continues as illustrated on FIG. 13B. A target pointer is set to the last field position, and a determination is made whether the target pointer is at a mask character position. If it is, the target pointer position is decreased by one and the examination is repeated. At such time as the target pointer is not at a mask character position, it is next determined whether the target pointer is at a null character position. If it is not, a command is sent to the display to indicate an operator error indicating the insert is not allowed. If the target pointer is at a null character position, the source pointer is set to the target pointer position minus one. Next, the target pointer is examined to determine whether it is at the cursor position. If it is not, the source pointer is examined to determine whether it is at a mask character position. If it is, the source pointer position is decreased by one and the source pointer position is reexamined until such time as it is determined that it is not at a mask character position. At such time, a character is copied from the source pointer position to the target pointer position, the target pointer is set to be equal to the source pointer, and the source pointer position is decreased by one. Once again, the target pointer is examined to determined whether it is at the cursor position, and this process repeats itself until it is determined that the target pointer is at the cursor position. At this time, the keyed character is copied to the cursor position, and a command is sent to the display to rewrite the field from the cursor position to the end of the field. In this manner, a data key is inserted at an appropriate entry field position, but not at an edit mask character position. The edit mask character positions are all safeguarded and protected so as not to be affected by any user editing operations.

The overall result of the foregoing description of the present invention is that entry field operations can be conducted according to the usual and understood procedures, while at the same time edit mask characters may be used in the entry fields to preserve predetermined entry field character positions for specific purposes. Referring again to FIG. 7, a single entry field relating to "social security number" will have edit mask characters at the hyphen character positions. These edit mask characters do not obstruct or detract from the overall appearance of the entry field display, but still accomplish the necessary character separation for the usual presentation of social security numbers in the grouping indicated on FIG. 7. Likewise, with respect to the "home phone number" entry field, edit mask characters are located at the two parenthetical positions, and at the hyphenated position, in order that a telephone number may be entered in the conventional and expected manner. The edit mask characters do not extend the entry field, nor do they detract from the display panel presentation. If new data were entered into any of the entry fields having edit mask characters, or old data were deleted from the entry fields, the edit mask characters would remain fixed in their relative positions in order to preserve the particular numeric groupings which had been selected for the particular entry fields. This provides an enhanced display panel presentation and keystroke processing which may be more conveniently usable by the operator.

All of the methods and techniques described with reference to the present invention are performed within the workstation controller, without need to reference the host processor. The workstation controller may be designed to perform these methods and techniques by those having skill in the art, and with reference to the invention and described herein. Furthermore, the enhanced presentation, enhanced user interface, and enhanced application interface, are achievable by the present invention may be accomplished in a system wholly or partially utilizing dependent workstations, and the invention provides the dependent workstation environment with an apparent degree of sophistication and enhancement which has not previously been available for dependent workstations. Even though these enhancements and improved features appear to be improvements in the dependent workstation, they are in fact achieved without any changes to the dependent workstation, but by merely enhancing the function of the workstation controller.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. In a system comprising a host processor connected to a plurality of workstations through an intermediary workstation controller, wherein each of the workstations has at least a keyboard and display screen, the improvement in display screen panel presentation comprising:
   a) host processor means for constructing a display panel data stream having entry field identifiers and edit mask character separators arranged in predetermined positions in said entry field identifiers;
   b) means for transmitting said data stream to said workstation controller;
   c) workstation controller means for retaining said entry field identifiers and said edit mask character separator positions, and further means for constructing a display panel image including edit mask characters for transmission to a predetermined workstation;
   d) means for transmitting said display panel image from said workstation controller to said workstation, and means for transmitting signals from said workstation keyboard to said workstation controller; and
   e) workstation controller means for receiving said signals from said workstation keyboard and means for reconstructing said display panel image in response to said received signals, said reconstructed display panel image having unchanged edit mask characters regardless of the otherwise reconstructed display panel image.

2. The apparatus of claim 1, further comprising means for transmitting said signals from said workstation controller to said host processor.

3. The apparatus of claim 2, further comprising means for transmitting all of the characters in an entry field from said workstation controller to said host processor excluding any mask characters.

4. In a system comprising a host processor connected to a plurality of workstations through an intermediary workstation controller, each workstation having a display screen for displaying panel images and a keyboard for modifying said display panel images, a method of preserving predetermined entry field character positions comprising the steps of:
   a) constructing a data stream in said host processor, said data stream defining the position and extent of entry fields and including predetermined edit mask character positions;
   b) transmitting said data stream to said workstation controller;
   c) constructing a display panel layout in said workstation controller, said layout including predetermined entry field positions and predetermined edit mask character positions within said entry field positions;
   d) transmitting said display panel layout to one of said workstations; and
   e) constructing a display panel image in said workstation, said image including said predetermined entry field positions and said edit mask character positions.

5. The method of claim 4, further comprising processing an edit key keystroke in said workstation controller, by modifying an entry field layout, but without modifying said entry field layout at said predetermined edit mask character positions.

6. The method of claim 5, further comprising transmitting said modified entry field layout from said workstation controller to said workstation, and constructing a display image at said workstation, said display image including the modified entry field and preserving the predetermined edit mask character positions.

* * * * *